(12) United States Patent
Choy

(10) Patent No.: US 6,757,680 B1
(45) Date of Patent: Jun. 29, 2004

(54) SYSTEM AND METHOD FOR INHERITING ACCESS CONTROL RULES

(75) Inventor: David Mun-Hien Choy, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 09/609,810

(22) Filed: Jul. 3, 2000

(51) Int. Cl.$^7$ ............................................. G06F 17/30
(52) U.S. Cl. ............................. 707/9; 707/4; 707/10; 707/102; 707/104
(58) Field of Search .......................... 707/4, 9, 10, 104, 707/203, 102, 103, 166, 206; 345/727; 706/45; 709/201

(56) References Cited

U.S. PATENT DOCUMENTS

| | | | |
|---|---|---|---|
| 5,483,596 A | 1/1996 | Rosenow et al. | 380/277 |
| 5,511,186 A | 4/1996 | Carhart et al. | 707/2 |
| 5,553,218 A * | 9/1996 | Li et al. | 707/102 |
| 5,615,112 A * | 3/1997 | Liu Sheng et al. | 707/104 |
| 5,630,127 A * | 5/1997 | Moore et al. | 707/102 |
| 5,644,770 A * | 7/1997 | Burke et al. | 717/166 |
| 5,734,899 A * | 3/1998 | Yoshizawa et al. | 707/203 |
| 5,745,896 A | 4/1998 | Vijaykumar | 707/1 |
| 5,787,428 A | 7/1998 | Hart | 707/9 |
| 5,809,317 A | 9/1998 | Kogan et al. | 707/501.1 |
| 5,826,268 A * | 10/1998 | Schaefer et al. | 707/9 |
| 5,937,402 A * | 8/1999 | Pandit | 707/4 |
| 5,978,811 A * | 11/1999 | Smiley | 707/103 |
| 5,991,776 A | 11/1999 | Bennett et al. | 707/205 |
| 6,012,067 A | 1/2000 | Sakar | 707/103 R |
| 6,029,160 A | 2/2000 | Cabrera et al. | 707/1 |
| 6,038,563 A * | 3/2000 | Bapat et al. | 707/10 |
| 6,067,542 A | 5/2000 | Carino, Jr. | 707/4 |
| 6,085,031 A * | 7/2000 | Johnson et al. | 345/727 |
| 6,085,191 A * | 7/2000 | Fisher et al. | 707/9 |
| 6,088,694 A | 7/2000 | Burns et al. | 707/2 |
| 6,112,209 A | 8/2000 | Gusack | 707/101 |
| 6,144,959 A | 11/2000 | Anderson et al. | 707/10 |
| 6,151,623 A * | 11/2000 | Harrison et al. | 709/206 |
| 6,154,741 A * | 11/2000 | Feldman | 707/9 |
| 6,192,405 B1 | 2/2001 | Bunnell | 709/202 |
| 6,249,873 B1 | 6/2001 | Richard et al. | 713/156 |
| 6,275,824 B1 | 8/2001 | O'Flaherty et al. | 707/10 |
| 6,308,173 B1 | 10/2001 | Glasser et al. | 707/103 R |
| 6,345,288 B1 * | 2/2002 | Reed et al. | 709/201 |
| 6,385,730 B2 | 5/2002 | Garrison | 713/202 |
| 6,473,748 B1 * | 10/2002 | Archer | 706/45 |
| 6,578,037 B1 * | 6/2003 | Wong et al. | 707/10 |
| 6,631,371 B1 * | 10/2003 | Lei et al. | 707/4 |

OTHER PUBLICATIONS

Deng, "Fast Control in Object–Oriented Repetitive Access," IEEE, 1994, pp. 173–175.*

* cited by examiner

Primary Examiner—Thuy N. Pardo
(74) Attorney, Agent, or Firm—John L. Rogitz

(57) ABSTRACT

A system and method are provided for an information management system (IMS) having an underlying relational database system (RDBMS) that allows an item to be associated with plural containers, and one of the containers is designated as the item's primary container. Inheritance of the primary container's access control rules can be activated, and when it is, the container's access control rules are automatically used to access the item. Otherwise, the item's access control rules are used. The container's rules can be propagated through many levels of containers/items.

13 Claims, 2 Drawing Sheets

ARCHITECTURE

SYSTEM AND METHOD FOR INHERITING ACCESS CONTROL RULES

FIELD OF THE INVENTION

The present invention relates to methods and systems for establishing access control rules in managing access to information items stored in a relational database management system (RDBMS).

BACKGROUND OF THE INVENTION

As set forth in related co-pending U.S. patent application Ser. No. (docket AM9-99-0210), information management systems (IMS) typically use a relational database management system (RDBMS) to manage data records. As an example, an IMS might manage document data, with the desire that some documents can be read by many users but only written to by a few. Many other high-level access rules can be enforced by the IMS. In any case, when a user wants to access the records of a document in the RDBMS, the user is routed through the IMS to first check for access control.

The documents themselves are broken down into records by the IMS and the records are stored in tabular form in the RDBMS, which can efficiently manage the records for querying using a language known as SQL. Only the IMS knows the high level access control rules with the high level rules being broken down by the IMS into low level rules for the RDBMS to enforce. An example of a low level rule is which users can perform which SQL operations against which data tables. Since the high level access control rules are for an entire document, low level access control rules are enforced table by table in the RDBMS, and are not enforced at any finer granularity (e.g., row by row). In any case, user applications must access the RDBMS indirectly, through the IMS, to ensure integrity and protection of data. The above-referenced application discloses an invention that essentially uses table view definitions in a novel way to enable users to access RDBMS directly without requiring modifications to the RDBMS, thereby enhancing performance, while at the same time maintaining high-level access control.

Of relevance to the present invention is ensuring effective access control for information items, with ease of administration and efficient access control checking. As recognized herein, access control rules for an item such as a document can be established simply by conceptually placing the item in a container, such as a folder, without requiring the editing of the items's control rules, an otherwise tedious and risky operation for many users. This is accomplished by allowing items placed in a folder to inherit access control rules from the folder. The folder's access control rules can be carefully defined by an administrator or security officer. When a folder is allowed to contain other folders (since folders themselves are also information items), the inheritance can propagate from one container to another. Unlike the case of a file in a directory of a file system, however, in which a single access path is normally provided to a file such that each directory in the path can restrict access to lower levels, the present invention recognizes that an item in a RDBMS can have multiple access paths, each of which may be controlled by separate protection rules, consequently requiring the novel invention provided herein.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer is programmed with instructions to selectively apply at least one container access control rule that is associated with a primary container to at least one item associated with both the primary container and with another container. The instructions embody method acts that include selecting whether to activate inheritance of the container access control rule, and then applying the container access control to the item only when inheritance is activated.

In a preferred embodiment, the method acts embodied by the instructions further include designating a container as the primary container for an item. Also, the method acts embodied by the instructions can include applying at least one item access control rule to the item, when inheritance is not activated. In a particularly preferred embodiment, the method acts embodied by the instructions include propagating the container access control rules through plural levels of containers.

In another aspect, a computer program product includes computer usable code means that are programmed with logic for establishing access control rules for an item in an information management system (IMS) for an application directly communicating with a relational database management system (RDBMS) associated with the IMS. The program product includes computer readable code means for selecting a primary container for the item. Also, computer readable code means activate inheritance of access control from container to item, while computer readable code means are provided for applying container access control rules to the item when the application seeks to access the item.

In still another aspect, a computer-implemented method includes inserting at least one data item associated with item access control rules into at least one data container associated with container access control rules. Access control rules to apply to the item are then selected, and one of: the item access control rules, and the container access control rules, are applied to the item based on the selecting act.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
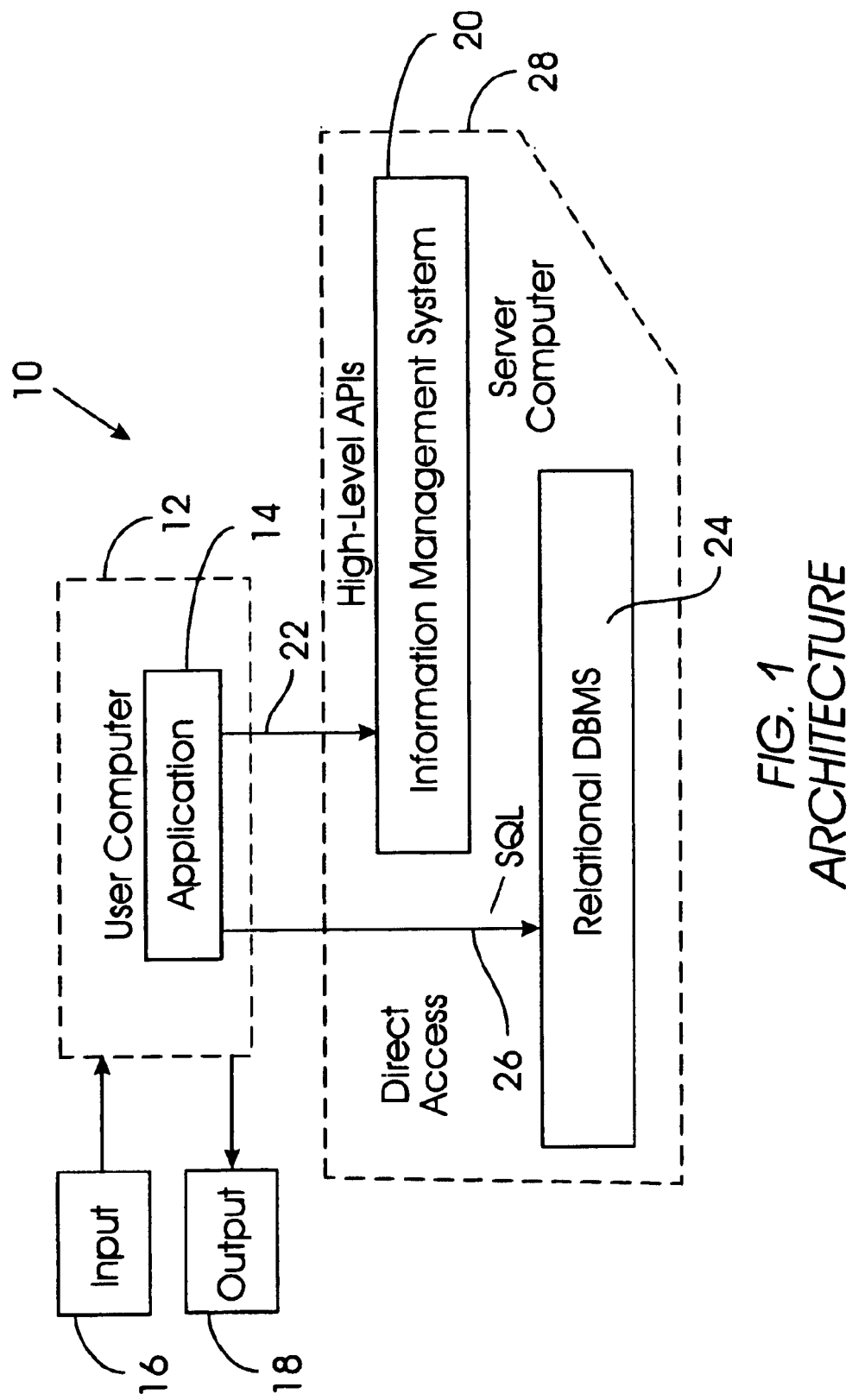
FIG. 1 is a block diagram of the present system.

Referring initially to FIG. 1, a system is shown, generally designated 10, that includes at least one user computer 12 having a software-implemented application 14 that generates queries. Input to the user computer 12 is via one or more input devices 16, and query results can be output on an output device 18. The input device 16 can be any suitable device, such as a keyboard, keypad, mouse, joystick, trackball, voice-recognition software, and so on. The output device 18 can be a monitor, a speaker, another computer or computer network, a printer, and so on.

As shown in FIG. 1, the user computer 12 communicates with an information management system (IMS) 20 via an IMS communication path 22 using high-level application programming interfaces (API). The IMS 20 communicates with a relational database system (RDBMS) 24, such as the present assignee's DB2, that stores records of documents managed by the IMS 20, with the IMS 20 enforcing high level access control rules pertaining to the application 14 vis-a-vis the records of the RDBMS 24. The communication between the application 14 and the RDBMS 24 can occur via a direct path 26, although it is to be understood that the inheritance principles disclosed herein apply equally to conventional systems in which the application 14 must communicate with the RDBMS 24 via the IMS 20. One or both of the IMS 20 and the RDBMS 24 can be hosted on a server computer 28, or each can have its own associated computer.

As intended herein, either or both of the user computer 12/server computer 28 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used.

In any case, the processor of the computers access appropriate software to undertake the logic of the present invention, which may be executed by a processor as a series of computer-executable instructions. The instructions may be contained on a data storage device with a computer readable medium, such as a computer diskette having a computer usable medium with a program of instructions stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C or C++ or Java code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
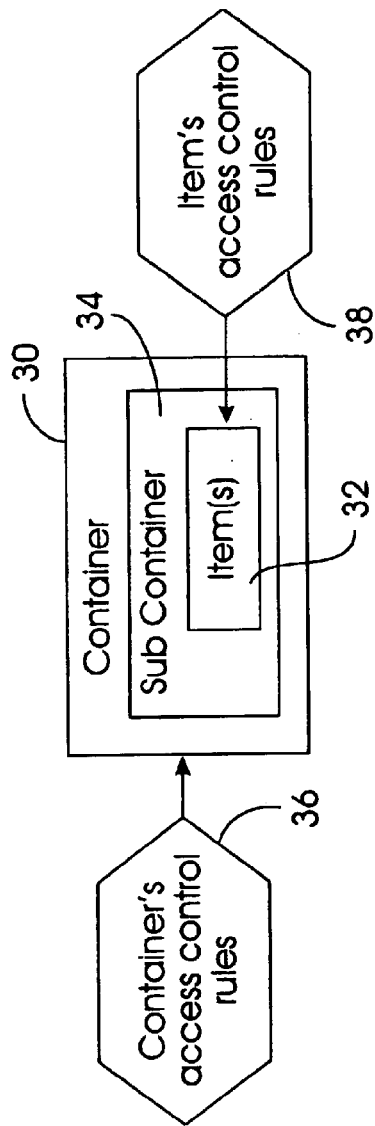
FIG. 2 is a schematic diagram showing containers and items.

Now referring to FIG. 2, a container 30, such as a computer-stored folder, holds one or more items 32, such as a computer-stored document. The items 32 can be heterogenous (e.g., they can be documents containing digital images, slides, and so forth, as well as text, spreadsheet, or video clip. An item may be contained in more than one container and, hence, have more than one access path. In the example shown in FIG. 2, the item 32 is held in a sub container 34 and, hence, can be accessed via both the container 30 and sub container 34 or explicitly via the item's ID without navigating through the item's containers. Note that the item may be contained in yet another container (not shown) that is unrelated to either the container 30 or the subcontainer 34.

The container 30 includes associated access control rules 36. Also, the item 32 can have associated individual access control rules 38. As set forth further below, the access control rules that are applied to the item 32 can be either the rules 36 or 38.

Figure 3:
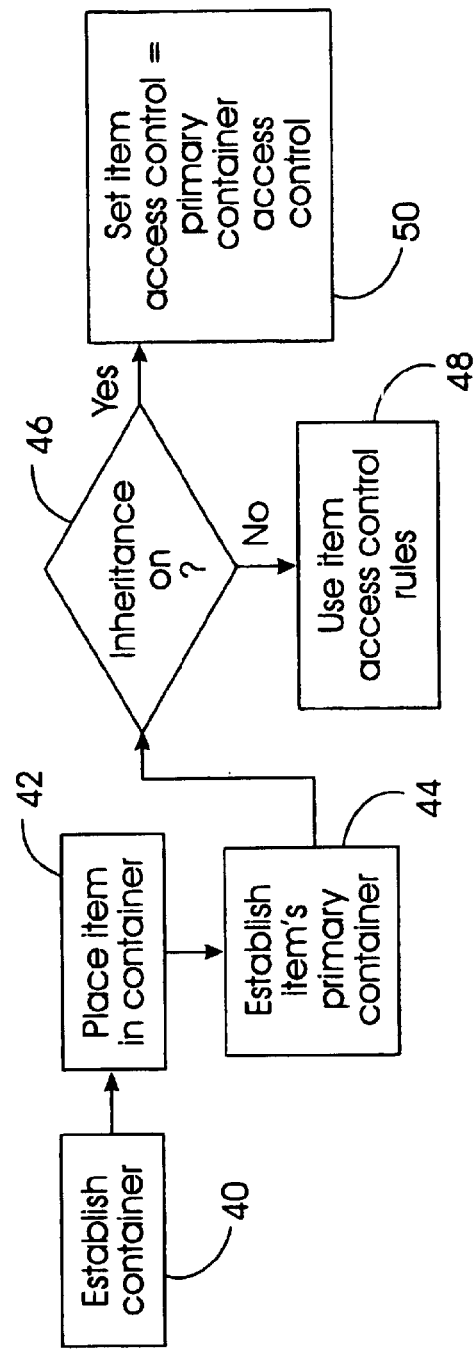
FIG. 3 is a flow chart of the present logic.

FIG. 3 shows the present logic. Commencing at block 40, the container 30 is established, and then at block 42 the item 32 is placed in the container 30. Proceeding to block 44, for items 32 having more than one container, a primary container for the item is defined.

When the item is accessed by an application, the logic moves to decision diamond 46, wherein it is determined whether the administrator or owner of the item 32 has indicated that the item should inherit its primary container's access control rules 36. In other words, at decision diamond 46 it is determined whether inheritance of the container access control rules 36 has been activated for the item 32. If not, the item is accessed at block 48 using the item's own control rules 38. On the other hand, if "inheritance" (the default for which is "off") has been set to "on", the item is accessed at block 50 using the primary container access control rules 36. It is to be understood that inheritance of access control rules can be recursive, that is, access control rules can be propagated through many levels of containers and sub containers.

To access the item 32 via the direct access path 26, the application 14 issues queries against RDBMS views created by the IMS 20 as set forth in the above-referenced related patent applications. The actual RDBMS tables are not explicitly accessible by the application 14. To support inheritance of access control rules, the following RDBMS view definition (in SQL) using recursive query can be used to obtain all items that inherit, as an example, a READ privilege from-a container.

```
CREATE VIEW ReadContainees AS
  WITH ITM AS
    (SELECT * FROM ITEMS
    WHERE ContainerFlag=1 AND PropagationFlag=1
      AND ACLCODE IN (SELECT * FROM
        ReadACLs)
    UNION ALL
    SELECT ICHILD.* FROM ITM IPARENT, ITEMS
      ICHILD
    WHERE ICHILD.ITEMID IN LinkIDs
      (IPARENT.CONTAINEES)
      AND ICHILD.ContainerFlag=1 AND
        ICHILD.PropagationFlag=1)
  SELECT DISTINCT LinkIDs(CONATINEES) FROM
    ITM
```

In the above code, "ReadACLs" is a table containing ACL codes that have granted read access to the application. Similar queries can be used to control other modes of access. It is to be understood that there are many other ways to design access control tables and to compose SQL queries.

In the particular example shown, the first SELECT statement retrieves the set of all container items (simply referred to as "containers" in the Figures) to which the current user has a READ access privilege and that propagate protection rules to their contained items, i.e., for which "inheritance" has been activated. The second SELECT statement recursively adds items that inherit protection rules from the set of containers and that themselves propagate access protection rules to items they might in turn contain. In the above code, "CONTAINEES" is a one-to-many unscoped link to contained items. LinkIDs is a "set user-defined function" on a collection type of abstract data type (ADT), returning a set of projected values on one of the ADT's attributes. If a collection type of ADT and a set UDF is not available, a SUBSELECT statement may be used. The third SELECT statement produces the ItemID of all contained items contained in any container in the set produced by the first two SELECT statements.

Using the above-defined view, an RDBMS view can be created on each item component table to control READ access using container rules inherited form the respective containers as follows:

CREATE VIEW RootRead AS
SELECT*FROM RootTable
WHERE ITEMID IN (SELECT * FROM ReadContainees)
CREATE VIEW ChildRead AS
SELECT * FROM ChildTable
WHERE ITEMID IN (SELECT * FROM ReadContainees)

Similar views may be created to support propagation of insertion, update, and deletion protection rules using container access control rules 36.

While the particular SYSTEM AND METHOD FOR INHERITING ACCESS CONTROL RULES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

I claim:

1. A computer-implemented method, comprising:
    inserting at least one data item associated with first access control rules into at least one data container associated with second access control rules;
    selecting which access control rules to apply to the item; and
    applying one of: the first access control rules, and the second access control rules, to the item, based on the selecting act, the item being contained in plural containers, each container being associated with a respective set of access control rules, wherein access to the item is possible via plural access paths, wherein the first access control rules apply only to the item and the second access control rules can apply to all items in the container, the access control rules being selected from the group including read access control rules, insertion access control rules, update access control rules, and delete access control rules.

2. The method of claim 1, wherein one of the containers is designated as a primary container the access control rules of the primary container are applied to the item.

3. The method of claim 1, further comprising propagating the second access control rules through plural levels of containers.

4. The method of claim 1, wherein the data container is a data item.

5. The method of claim 1, wherein the data container contains heterogenous data items.

6. A computer programmed with instructions to selectively apply at least one access control rule associated with a container to at least one item associated with the container, the instructions embodying method acts comprising:
    selecting whether to activate inheritance of the container's access control rule; and
    applying the container's access control rule to the item only when inheritance is activated, wherein
    the container's access control rule pertain to all items in the container for which inheritance is activated, and individual item access control rules are applied to items in the container for which inheritance is not activated, the access control rules being selected from the group including read access control rules, insertion access control rules, update access control rules, and delete access control rules.

7. The computer of claim 6, wherein the method acts embodied by the instructions further include designating a container as the primary container for an item.

8. The computer of claim 7, wherein the method acts embodied by the instructions further include applying at least one access control rule to the item, when inheritance is not activated.

9. The computer of claim 6, wherein the item is contained in plural containers, each being associated with a respective set of access control rules, and the method acts embodied by the instructions further include:
    designating one of the containers as a primary container; and
    applying the access control rules of the primary container to the item.

10. The computer of claim 9, wherein the method acts embodied by the instructions further comprise propagating the container access control rules through plural levels of containers.

11. A computer program product including computer usable code means programmed with logic for establishing access control rules for an item in an information management system (IMS) for an application directly communicating with a relational database management system (RDBMS) associated with the IMS, the program product comprising:
    computer readable code means for selecting a primary container for the item;
    computer readable code means for activating inheritance of access control from container to item; and
    computer readable code means for applying container access control rules to the item when the application seeks to access the item, wherein
    the container's access control rules pertain to all items in the container for which inheritance is activated, and individual item access control rules are applied to items in the container for which inheritance is not activated, the access control rules being selected from the group including read access control rules, insertion access control rules, update access control rules, and delete access control rules.

12. The computer program product of claim 11, further comprising:

computer readable code means for inserting the item into plural containers; and computer readable code means for selecting which container is the primary container.

13. The computer program product of claim 12, further comprising computer readable code means for propagating the container access control rules through plural levels of containers.

* * * * *